(12) United States Patent
Wang (10) Patent No.: US 12,447,773 B1
(45) Date of Patent: Oct. 21, 2025

(54) WHEEL ASSEMBLY

(71) Applicant: Haiyan Wang, Songzi (CN)

(72) Inventor: Haiyan Wang, Songzi (CN)

( * ) Notice: Subject to any disclaimer, the term of this patent is extended or adjusted under 35 U.S.C. 154(b) by 0 days.

(21) Appl. No.: 19/075,702

(22) Filed: Mar. 10, 2025

(51) Int. Cl.
*B60B 33/00* (2006.01)

(52) U.S. Cl.
CPC ........ *B60B 33/001* (2013.01); *B60B 33/0021* (2013.01); *B60B 33/0049* (2013.01); *B60B 33/0068* (2013.01); *B60B 33/0042* (2013.01); *B60B 2360/322* (2013.01); *B60B 2360/50* (2013.01); *B60B 2380/12* (2013.01)

(58) Field of Classification Search
CPC ....... B60B 29/002; B60B 30/10; B60B 33/00; B60B 33/001; B60B 33/0015; B60B 33/0018; B60B 33/0021; B60B 33/0002; B60B 33/0023; B60B 33/0026; B60B 33/04; B60B 33/0042; B60B 33/0044; B60B 33/0049; B60B 33/0007; B60B 33/0068; B60B 33/0078; B60B 2360/104; B60B 2360/322; B60B 2360/50; B60B 2380/12; B60B 2900/311; B60B 2900/321; B60B 2900/572; B60B 16/30; B60B 16/33; B62B 2301/08; B62B 2301/10

See application file for complete search history.

(56) References Cited

U.S. PATENT DOCUMENTS

| | | | | |
|---|---|---|---|---|
| 2,103,202 A | * | 12/1937 | Green | A47B 91/02 16/21 |
| 2,205,301 A | * | 6/1940 | Martin | B60B 3/18 301/35.61 |
| 4,068,342 A | * | 1/1978 | Carrier | B60B 33/0002 384/615 |
| 4,120,071 A | * | 10/1978 | Crescenzi | B60B 33/0042 16/37 |
| 4,351,084 A | * | 9/1982 | Fontana | B60B 33/0028 16/45 |
| 4,669,580 A | * | 6/1987 | Neville | B60B 33/0042 188/69 |
| 5,058,959 A | * | 10/1991 | Miles | G09F 3/00 40/6 |

(Continued)

FOREIGN PATENT DOCUMENTS

| | | | |
|---|---|---|---|
| CN | 210169244 U | * | 3/2020 |
| JP | 2006224707 A | * | 8/2006 |
| TW | 202108405 A | * | 3/2021 |

*Primary Examiner* — Chuck Y Mah (57) ABSTRACT

A removable wheel assembly includes a mounting base, a caster assembly and a detachment mechanism. The mounting base is provided with an insertion hole and a transverse guide groove communicated with the insertion hole. The caster assembly includes an insertion shaft, a wheel bracket, a rotating wheel and a housing. The insertion shaft includes a first end portion, and the first end portion is provided with a first engagement portion. The wheel bracket is connected to the insertion shaft. The rotating wheel is mounted on the wheel bracket. The housing includes a first housing and a second housing engaged with each other, and both the first housing and the second housing cover an outer side of the rotating wheel. The detachment mechanism includes a sliding member slidably disposed within the transverse guide groove and an elastic member connected to the sliding member.

17 Claims, 8 Drawing Sheets

(56) References Cited

U.S. PATENT DOCUMENTS

| | | | | |
|---|---|---|---|---|
| 5,062,178 | A * | 11/1991 | Chiu | B60B 33/0002 16/38 |
| 5,594,974 | A * | 1/1997 | Wattron | B60B 33/0002 16/38 |
| 5,934,639 | A * | 8/1999 | Chiang | A47B 91/00 248/346.11 |
| 8,671,519 | B1 * | 3/2014 | Spraley | B60B 33/0018 16/30 |
| 9,221,300 | B1 * | 12/2015 | Pastore | B60B 33/0049 |
| 9,950,563 | B2 * | 4/2018 | Tsai | B60B 33/0002 |
| 10,155,415 | B1 * | 12/2018 | Lu | B60B 33/045 |
| 10,434,820 | B1 * | 10/2019 | Savruha | B60B 33/0081 |
| 2003/0178888 | A1 * | 9/2003 | Chang | A45C 13/08 301/108.3 |
| 2005/0015928 | A1 * | 1/2005 | Arsenault | B60B 33/0039 16/300 |
| 2010/0050376 | A1 * | 3/2010 | Tsang | A45C 5/14 16/45 |
| 2010/0287730 | A1 * | 11/2010 | Von Bordelius | B60B 33/001 16/18 R |
| 2016/0355053 | A1 * | 12/2016 | Warncke | B60B 33/02 |
| 2018/0134074 | A1 * | 5/2018 | Franzone, Jr. | B60B 33/0018 |

* cited by examiner

WHEEL ASSEMBLY

TECHNICAL FIELD

The present invention relates to a wheel assembly, in particular to the technical field of caster assemblies.

BACKGROUND

At present, caster assemblies are widely used in various mobile devices such as luggage, medical equipment, and shopping carts. During operation, direct contact with the ground often leads to wear, damage, or performance degradation of the caster assembly, necessitating replacement or maintenance.

Most conventional caster assemblies employ fixed installation structures, requiring specialized tools for disassembly, which is time-consuming and labor-intensive. While some detachable caster assemblies address disassembly challenges, their complex structures with numerous components are prone to loosening, jamming, or failure after prolonged use.

Additionally, existing caster assemblies lack protective structures for the rotating wheel, allowing dust and debris to infiltrate the internal components, thereby impairing steering flexibility and service life. Exposed wheel structures also compromise aesthetic integrity. Thus, there is an urgent need for a caster assembly with a simplified structure, tool-free disassembly, and protective features to resolve these issues.

SUMMARY

To address the aforementioned technical issues in the prior art, the present invention provides a wheel assembly characterized by a simple structure, convenient disassembly without tools, and protective functionality. By incorporating a detachment mechanism, the assembly enables rapid mounting and removal of the caster without requiring any tools. Additionally, a housing structure is provided to effectively protect the rotating wheel from the entry of debris.

The technical solution adopted by the present invention to solve the technical problem is as follows.

A wheel assembly includes a mounting base, a caster assembly and a detachment mechanism.

The mounting base is provided with an insertion hole and a transverse guide groove communicated with the insertion hole.

The caster assembly includes an insertion shaft, a wheel bracket, a rotating wheel and a housing; the insertion shaft includes a first end portion, and the first end portion is provided with a first engagement portion; the wheel bracket is connected to the insertion shaft; the rotating wheel is mounted on the wheel bracket; the housing includes a first housing and a second housing engaged with each other, and both the first housing and the second housing cover an outer side of the rotating wheel.

The detachment mechanism includes a sliding member slidably disposed within the transverse guide groove and an elastic member connected to the sliding member; the sliding member is provided with a through hole and a positioning structure, the through hole is disposed above the insertion hole, and the positioning structure is configured to cooperate with the first engagement portion for locking; the elastic member is configured to maintain the sliding member in a locking position.

Furthermore, the first housing is provided with a plurality of first clamping grooves, an outer periphery of the rotating wheel is provided with a plurality of second clamping grooves, and the second housing is provided with clamping blocks corresponding to the first clamping grooves and the second clamping grooves; the clamping blocks are inserted into the first clamping grooves and engaged with the second clamping grooves.

Furthermore, a diameter of the second housing is less than a diameter of the first housing.

Furthermore, the caster assembly further includes a protective cover and a ball bearing; a shaft shoulder is disposed at a middle part of the insertion shaft; the protective cover is sleeved over the ball bearing, and both the protective cover and the ball bearing are disposed between the shaft shoulder and the wheel bracket.

Furthermore, the ball bearing includes an outer ring, an inner ring, a plurality of rolling balls and a retaining ring; the rolling balls are disposed between the outer ring and the inner ring, and the retaining ring is configured to seal an opening between the outer ring and the inner ring.

Furthermore, one end of the transverse guide groove is provided with a limiting structure; the elastic member is a return spring, one end of the return spring abuts against the limiting structure, and the other end of the return spring abuts against the sliding member.

Furthermore, the sliding member is further provided with a first protrusion and a second protrusion, and the return spring is sleeved over the first protrusion.

Furthermore, the other end of the transverse guide groove is provided with an opening; the detachment mechanism further includes a button, and the button is mounted on the second protrusion and extends out of the opening.

Furthermore, the button is disposed on one side of the first engagement portion, and the return spring is disposed on the other side of the first engagement portion.

Furthermore, the mounting seat further includes a cover body, and the cover body covers over the transverse guide groove.

Furthermore, the cover body is provided with a screw; the mounting seat is provided with a mounting hole corresponding to the screw, and the cover body is fixed to the mounting seat by the screw.

Furthermore, the insertion shaft further includes a second end portion; the second end portion is provided with a second engagement portion pivotally connected to the wheel bracket.

Furthermore, the caster assembly further includes a pin; the wheel bracket is provided with a shaft hole; the second engagement portion is rotatably disposed in the shaft hole, and the pin is disposed in a wall of the shaft hole and engaged with the second engagement portion.

Furthermore, an end face of the first end portion is provided with a first chamfer configured to guide the insertion shaft into the insertion hole.

Furthermore, a lower surface of the positioning structure is provided with a second chamfer cooperating with the first engagement portion; the second chamfer is configured to facilitate smooth sliding of the positioning structure into the first engagement portion.

Furthermore, an outer periphery of the rotating wheel is made of rubber.

Furthermore, both the first housing and the second housing are made of polyethylene.

The beneficial effects of the present invention are as follows. The present invention provides a wheel assembly. Through the arrangement of the above structure, during use, the first end portion of the insertion shaft is passed through the insertion hole and the through hole. The positioning structure on the sliding member cooperates with the first engagement portion for locking, and the elastic member maintains the sliding member in the locking position, realizing a stable connection between the insertion shaft and the mounting base. When disassembly is required, pressing the button to drive the sliding member so that the positioning structure disengages from the first engagement portion, and then the insertion shaft can be taken out. The disassembly and assembly are convenient, and the structure is stable. Meanwhile, by providing the first housing and the second housing to be engaged with each other and cover over the rotating wheel, a protective structure is formed, which can effectively prevent foreign objects from entering the interior of the rotating wheel, enhancing the aesthetics and service life of the product.

DETAILED DESCRIPTION OF THE EMBODIMENTS

In order to make the aims, technical solution and advantages of the present invention will be clearly, the present invention is further described below in combination with accompanying drawings and implementations. It should be understood that the specific embodiments described herein are intended only to explain the present invention and are not intended to define the present invention.

Figure 1:
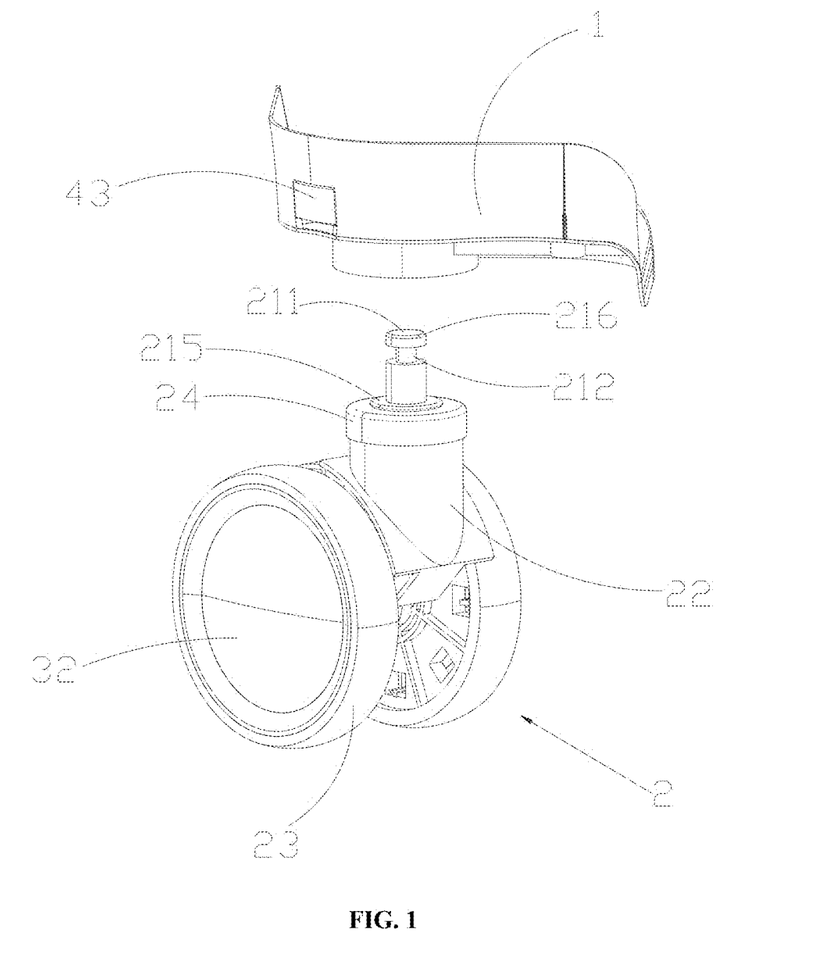
FIG. 1 is a schematic view of an overall structure of the wheel assembly according to the present invention.
Figure 2:
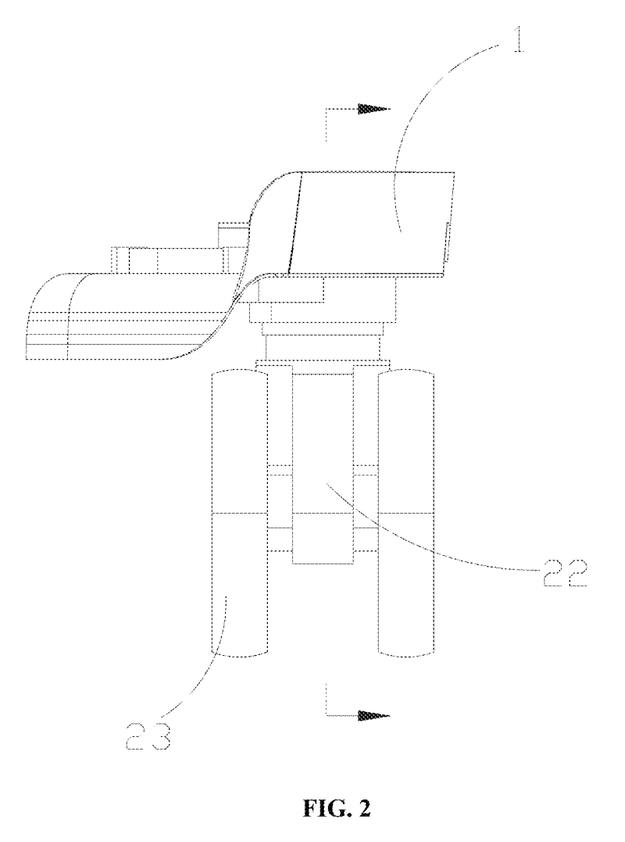
FIG. 2 is a schematic view of an overall structure of the wheel assembly from another angle according to the present invention.
Figure 3:
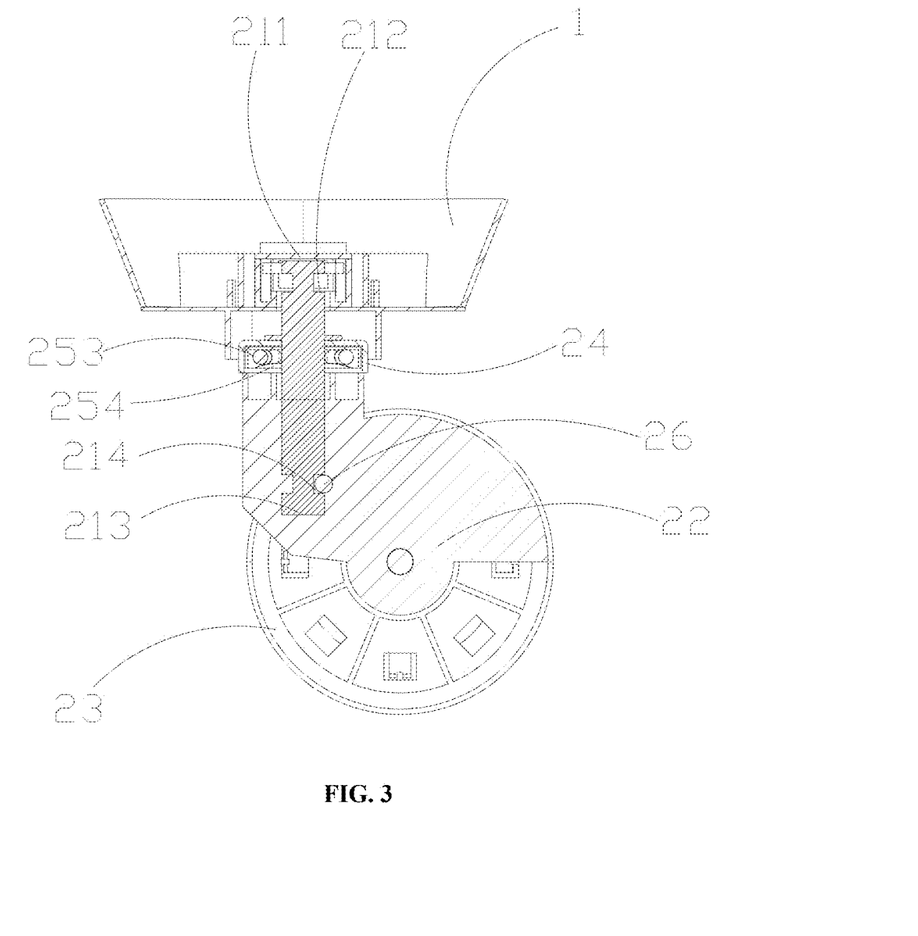
FIG. 3 is a cross-sectional structural view of FIG. 2.
Figure 4:
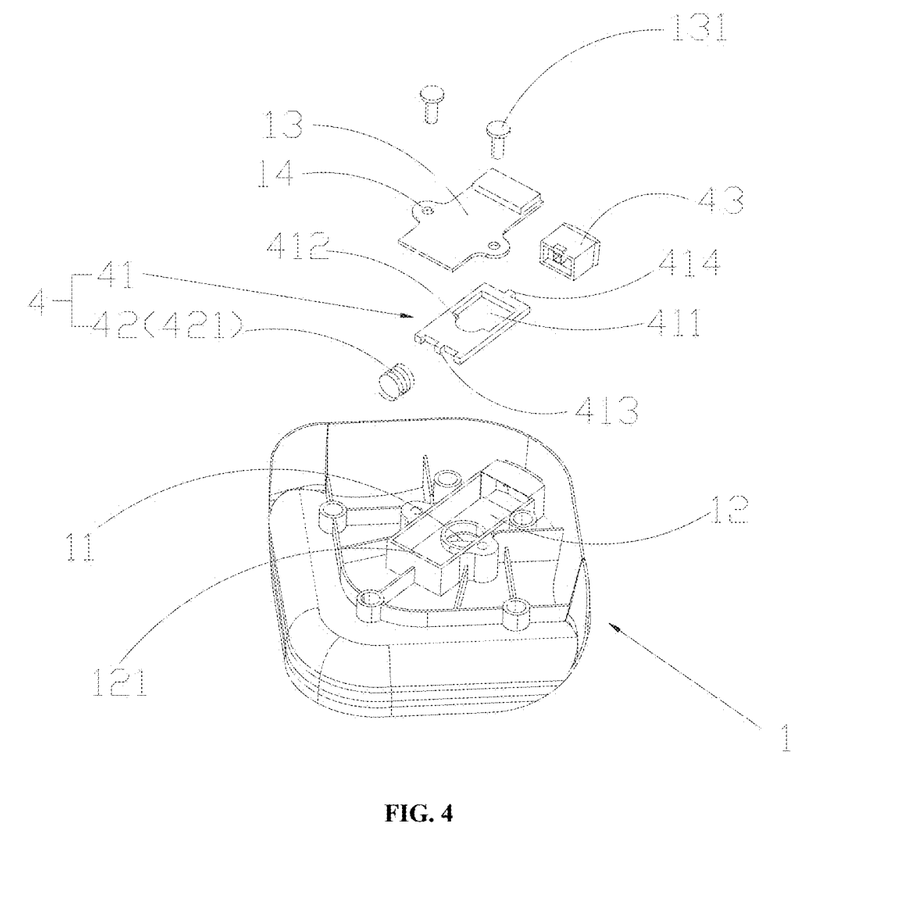
FIG. 4 is an exploded view of a mounting base of the wheel assembly according to the present invention.
Figure 5:
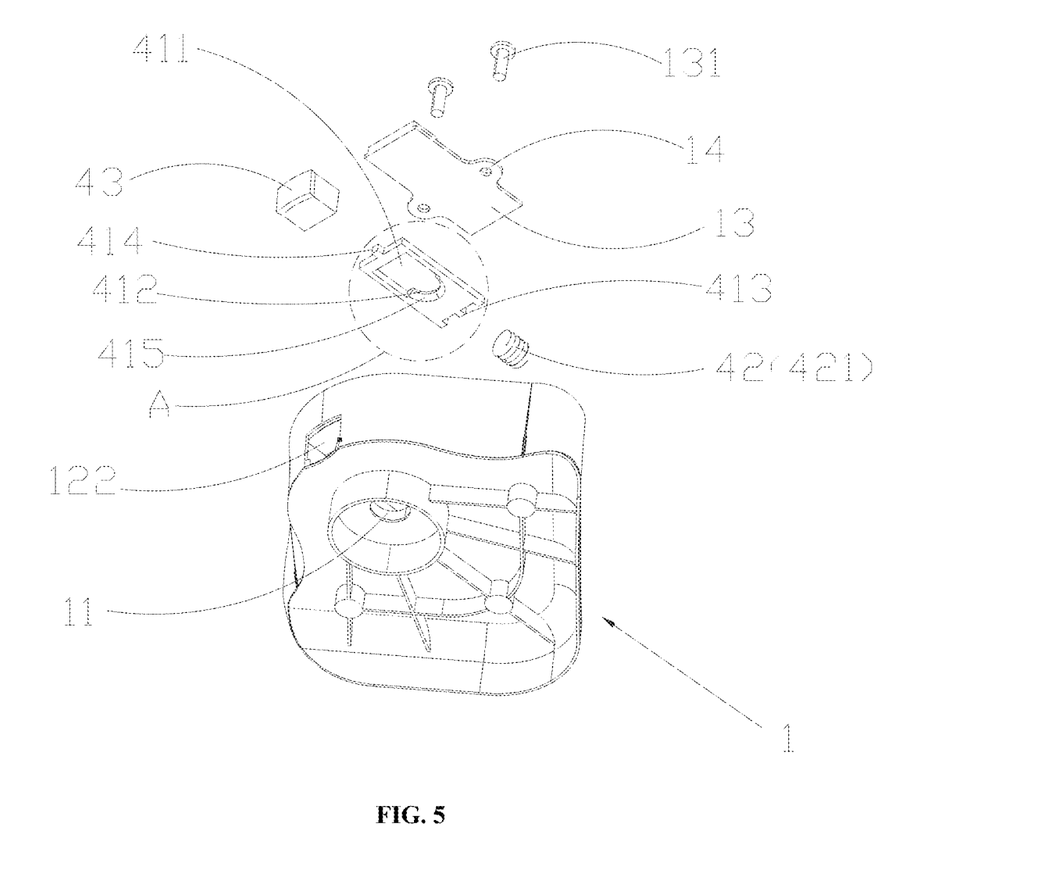
FIG. 5 is an exploded view of the mounting base of the wheel assembly from another angle according to the present invention.
Figure 6:
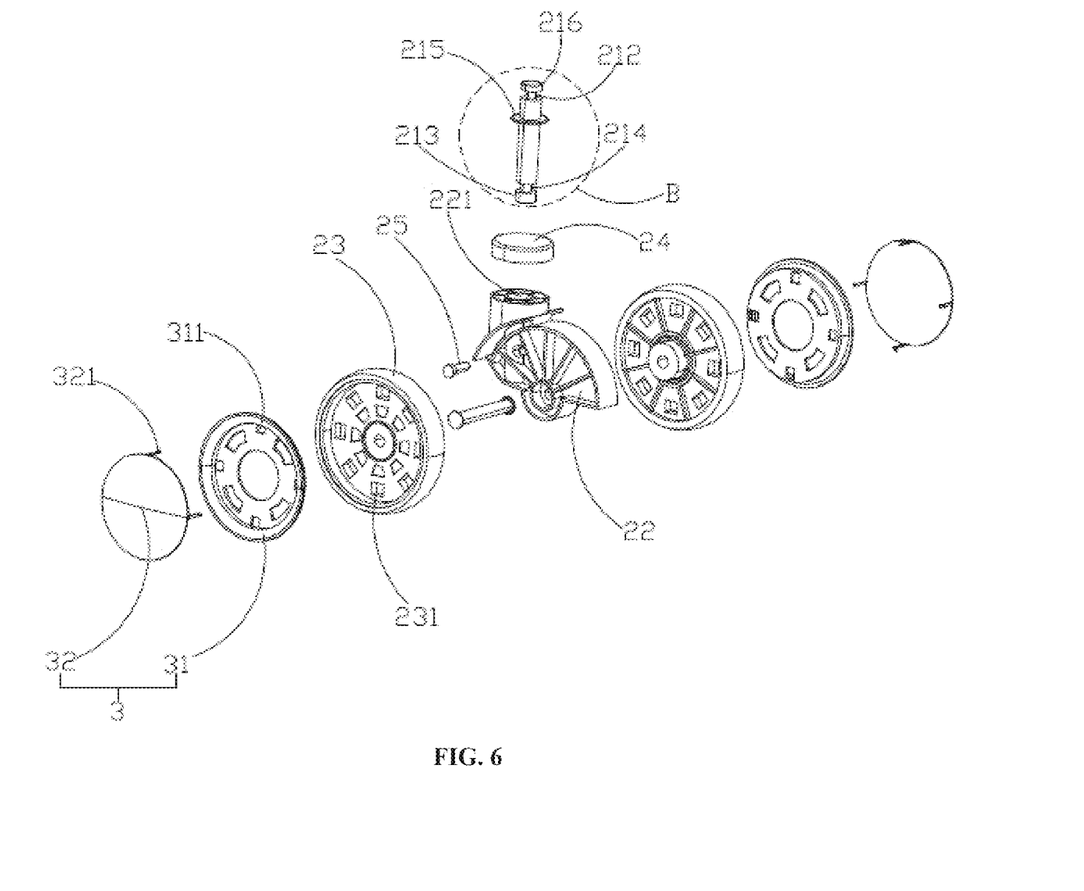
FIG. 6 is an exploded view of a caster assembly of the wheel assembly according to the present invention.
Figure 7:
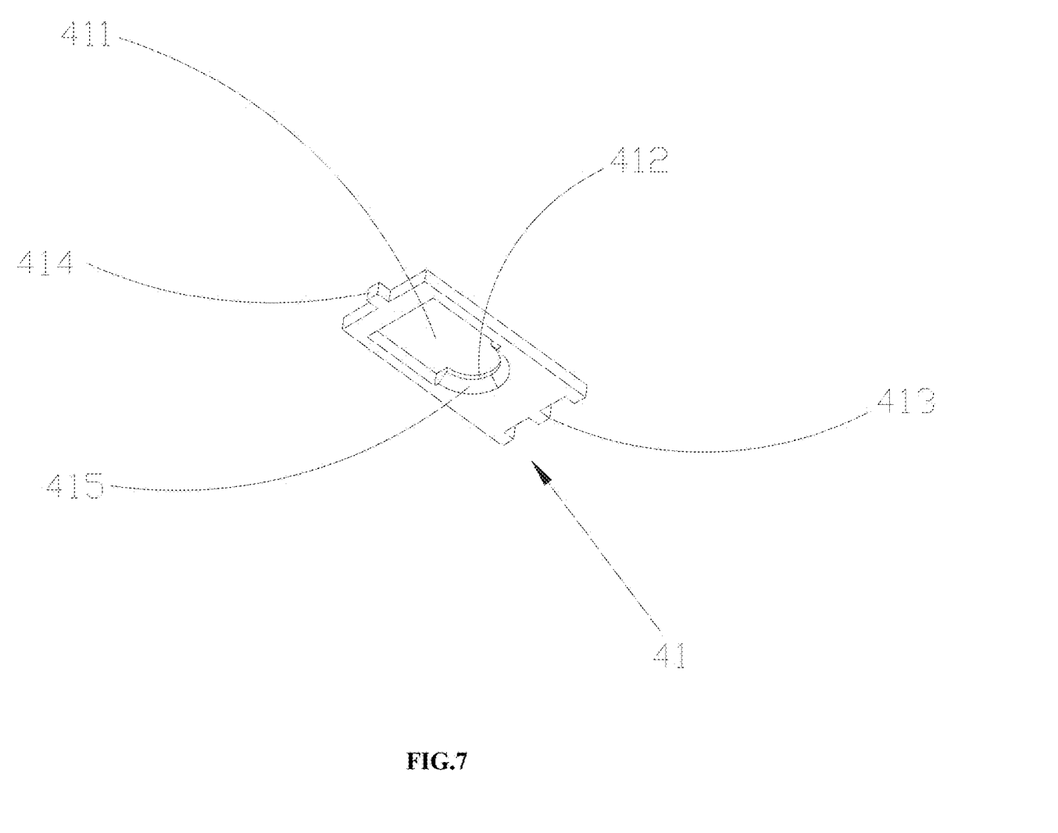
FIG. 7 is an enlarged view of Area A in FIG. 5.
Figure 8:
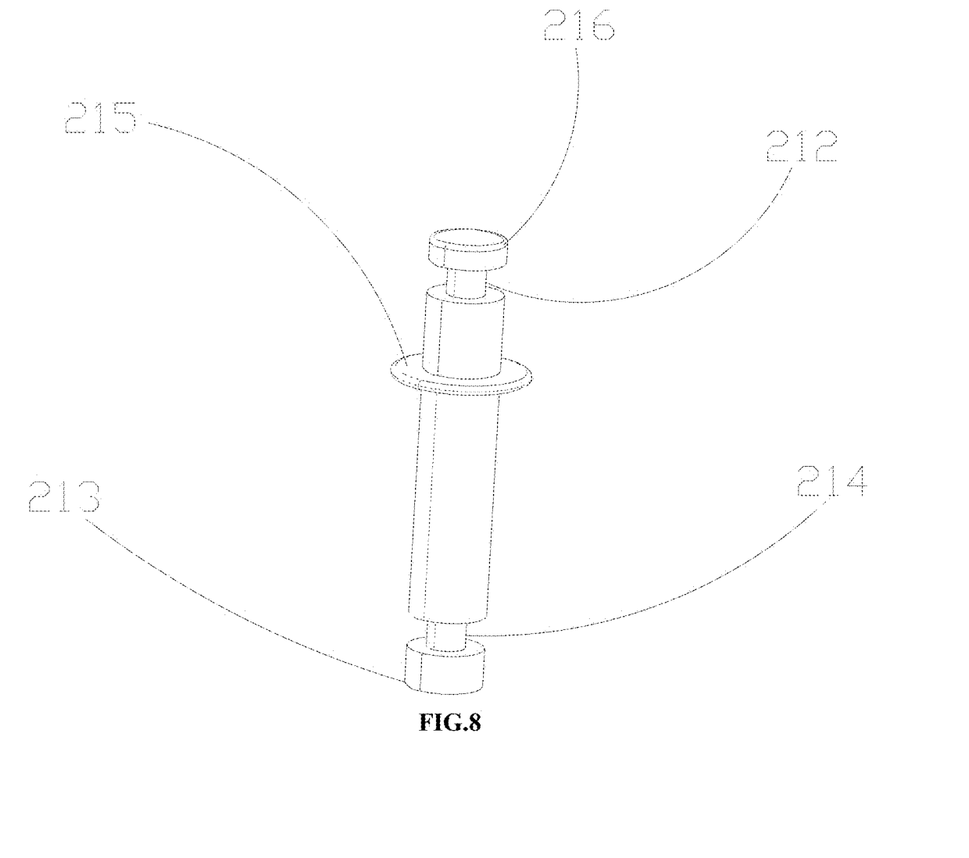
FIG. 8 is an enlarged view of Area B in FIG. 6.

Referring to FIGS. 1-8, the present invention provides a wheel assembly including:

a mounting base 1, which is provided with an insertion hole 11 and a transverse guide groove 12 communicating with the insertion hole 11;

a caster assembly 2, which includes an insertion shaft 21, a wheel bracket 22, a rotating wheel 23 and a housing 3; the insertion shaft 21 includes a first end portion 211, and the first end portion 211 is provided with a first engagement portion 212; the wheel bracket 22 is connected to the insertion shaft 21; the rotating wheel 23 is mounted on the wheel bracket 22; the housing 3 includes a first housing 31 and a second housing 32 engaged with each other, and both the first housing 31 and the second housing 32 cover an outer side of the rotating wheel 23;

a detachment mechanism 4, which includes a sliding member 41 slidably disposed within the transverse guide groove 12 and an elastic member 42 connected to the sliding member 41; the sliding member 41 is provided with a through hole 411 and a positioning structure 412, the through hole 411 is disposed above the insertion hole 11, and the positioning structure 412 is configured to cooperate with the first engagement portion 212 for locking; the elastic member 42 is configured to maintain the sliding member 41 in a locking position.

Through the arrangement of the above structure, during use, the first end portion 211 of the insertion shaft 21 is passed through the insertion hole 11 and the through hole 411. The positioning structure 412 on the sliding member 41 cooperates with the first engagement portion 212 for locking, and the return spring 421 maintains the sliding member 41 in the locking position. When disassembly is required, press the button 43 to make the sliding member 41 slide inward, compressing the return spring 421 to make it elastically deform, so that the positioning structure 412 is disengaged from the first engagement portion 212. Then, the insertion shaft 21 can be taken out. When the button 43 is released, the return spring 421 recovers its deformation and resets the sliding member 41.

In this embodiment, the first housing 31 is provided with a plurality of first clamping grooves 311, an outer periphery of the rotating wheel 23 is provided with a plurality of second clamping grooves 231, and the second housing 32 is provided with clamping blocks 321 corresponding to the first clamping grooves 311 and the second clamping grooves 231; the clamping blocks 321 are inserted into the first clamping grooves 311 and engaged with the second clamping grooves 231. Through the arrangement of the above structure, the clamping blocks 321 firmly fix the first housing 31 and the second housing 32 on the outer periphery of the rotating wheel 23, forming a stable protective structure.

In this embodiment, a diameter of the second housing 32 is less than that of the first housing 31. Through the arrangement of the above structure, the second housing 32 can closely cooperate with the first housing 31 to form a firm protective housing, which also has certain aesthetic appeal.

In this embodiment, the caster assembly 2 further includes a protective cover 24 and a ball bearing 25; a shaft shoulder 215 is disposed at the middle part of the insertion shaft 21; the protective cover 24 is sleeved over the ball bearing 25, and both the protective cover 24 and the ball bearing 25 are disposed between the shaft shoulder 215 and the wheel bracket 22. Through the arrangement of the above structure, when the caster rotates, the shaft shoulder 215 serves as a support point. The protective cover 24 can enclose the ball bearing 25, preventing external dust and debris from entering the bearing, thus ensuring the rotational flexibility of the caster and the service life of the bearing.

In this embodiment, the ball bearing 25 includes an outer ring 251, an inner ring 252, a plurality of rolling balls 253 and a retaining ring 254; the rolling balls 253 are disposed between the outer ring 251 and the inner ring 252, and the retaining ring 254 is configured to seal an opening between the outer ring 251 and the inner ring 252. Through the arrangement of the above structure, when the assembly of the caster assembly 2 is completed, the protective cover 24 is sleeved over the ball bearing 25, and the entire ball bearing 25 is disposed between the shaft shoulder 215 and the wheel bracket 22. Under this assembly relationship, the abutting action formed by the wheel bracket 22 and the shaft shoulder 215 enables the retaining ring 254 to seal tightly the annular opening between the outer ring 251 and the inner ring 252, effectively preventing the rolling balls 253 from falling out of the bearing during the movement of the rotating wheel, while ensuring the flexible rotation performance of the bearing.

In this embodiment, one end of the transverse guide groove 12 is provided with a limiting structure 121; the elastic member 42 is a return spring 421, one end of the return spring 421 abuts against the limiting structure 121, and the other end of the return spring 421 abuts against the sliding member 41. Through the arrangement of the above structure, the sliding member 41 can automatically return to the locking state under the action of the return spring 421.

In this embodiment, the sliding member 41 is further provided with a first protrusion 413 and a second protrusion 414, and the return spring 421 is sleeved over the first protrusion 413. Through the arrangement of the above structure, the first protrusion 413 can position the return spring 421, preventing the return spring 421 from shifting during operation.

In this embodiment, the other end of the transverse guide groove 12 is provided with an opening 122; the detachment mechanism 4 further includes a button 43, and the button 43 is mounted on the second protrusion 414 and extends out of the opening 122. Through the arrangement of the above structure, the button 43 extends out of the transverse guide groove 12, which facilitates the operation of the user.

In this embodiment, the button 43 is disposed on one side of the first engagement portion 212, and the return spring 421 is disposed on the other side of the first engagement portion 212. Through the arrangement of the above structure, when the button 43 is pressed, the sliding member 41 will slide within the transverse guide groove 12 where the first engagement portion 212 is, causing the positioning structure 412 to disengage from the first engagement portion 212 and thus realizing the disassembly function.

In this embodiment, the mounting seat 1 further includes a cover body 13, and the cover body 13 covers over the transverse guide groove 12. Through the arrangement of the above structure, it can prevent the return spring 421 from sliding upwards when being compressed under force. Meanwhile, it facilitates the maintenance and replacement of the internal parts.

In this embodiment, the cover body 13 is provided with a screw 131; the mounting seat 1 is provided with a mounting hole 14 corresponding to the screw 131, and the cover body 13 is fixed to the mounting seat 1 by the screw 131. Through the arrangement of the above structure, it not only ensures a firm connection between the cover body 13 and the mounting seat 1, but also facilitates the disassembly of the cover body 13 for the inspection and repair of the internal parts.

In this embodiment, the insertion shaft 21 further includes a second end portion 213; the second end portion 213 is provided with a second engagement portion 214 pivotally connected to the wheel bracket 22. Through the arrangement of the above structure, the wheel bracket 22 can freely rotate relative to the insertion shaft 21, thus realizing the steering function of the caster.

In this embodiment, the caster assembly 2 further includes a pin 26; the wheel bracket 22 is provided with a shaft hole 221; the second engagement portion 214 is rotatably disposed in the shaft hole 221, and the pin 26 is disposed in the wall of the shaft hole 221 and engaged with the second engagement portion 214. Through the arrangement of the above structure, the pin 26 locks the second engagement portion 214 of the insertion shaft 21 in the shaft hole 221 of the wheel bracket 22. It not only restricts the axial movement but also allows the insertion shaft 21 to rotate freely relative to the wheel bracket 22, ensuring the normal function of the caster.

In this embodiment, an end face of the first end portion 211 is provided with a first chamfer 216 configured to guide the insertion shaft 21 into the insertion hole 11. Through the arrangement of the above structure, during the installation process, the first chamfer 216 can guide the insertion shaft 21 to align with the position of the insertion hole 11, making it easier for the insertion shaft 21 to inserted into the insertion hole 11 and improving the installation efficiency.

In this embodiment, a lower surface of the positioning structure 412 is provided with a second chamfer 415 cooperating with the first engagement portion 212; the second chamfer 415 is configured to facilitate the positioning structure 412 to slide smoothly into the first engagement portion 212. Through the arrangement of the above structure, during the installation process, the second chamfer 415 can make it easier for the positioning structure 412 to slide into the first engagement portion 212, thereby achieving the locking.

In this embodiment, an outer periphery of the rotating wheel 23 is made of rubber. Through the arrangement of the above structure, it can increase the frictional force between the rotating wheel 23 and the ground, prevent slipping, and meanwhile, it has excellent shock absorption and wear resistance properties.

In this embodiment, both the first housing 31 and the second housing 32 are made of polyethylene. Through the arrangement of the above structure, it can ensure that the housing has sufficient strength and toughness. Meanwhile, the housing is lightweight, corrosion-resistant and has a long service life.

It should be understood that the application of the present invention is not limited to the embodiments mentioned above. Those of ordinary skill in the art can obtain improvements or modifications based on the above descriptions. All such improvements and modifications should fall within the scope of protection of the claims of the present invention.

What is claimed is:

1. A wheel assembly comprising:
   a mounting base provided with an insertion hole and a transverse guide groove communicating with the insertion hole;
   a caster assembly, wherein the caster assembly comprises an insertion shaft, a wheel bracket, at least one rotating wheel and each said rotating wheel having a housing; the insertion shaft comprises a first end portion, and the first end portion is provided with a first engagement portion; the wheel bracket is connected to the insertion shaft; each said rotating wheel is mounted on the wheel bracket; each said housing comprises a first housing and a second housing engaged with each other, and both the first housing and the second housing cover an outer side of the rotating wheel; and
   a detachment mechanism, wherein the detachment mechanism comprises a sliding member slidably disposed within the transverse guide groove and an elastic member connected to the sliding member; the sliding member is provided with a through hole and a positioning structure, the through hole is disposed above the insertion hole, and the positioning structure is configured to be releasably engageable with the first engagement portion; the elastic member is configured to maintain the sliding member in a locking position where said positioning structure engages said first engagement portion.

2. The wheel assembly according to claim 1, wherein the first housing is provided with a plurality of first clamping grooves, an outer periphery of the rotating wheel is provided with a plurality of second clamping grooves, and the second housing is provided with clamping blocks corresponding to the first clamping grooves and the second clamping grooves;

the clamping blocks are inserted through the first clamping grooves and engaged with the second clamping grooves.

3. The wheel assembly according to claim 2, wherein a diameter of the second housing is less than a diameter of the first housing.

4. The wheel assembly according to claim 1, wherein the caster assembly further comprises a protective cover and a ball bearing; a shaft shoulder is disposed at a middle part of the insertion shaft; the protective cover is sleeved over the ball bearing, and both the protective cover and the ball bearing are disposed between the shaft shoulder and the wheel bracket.

5. The wheel assembly according to claim 4, wherein the ball bearing comprises an outer ring, an inner ring, a plurality of rolling balls and a retaining ring; the rolling balls are disposed between the outer ring and the inner ring, and the retaining ring is configured to seal an opening between the outer ring and the inner ring.

6. The wheel assembly according to claim 1, wherein one end of the transverse guide groove is provided with a limiting structure; the elastic member is a return spring, one end of the return spring abuts against the limiting structure, and the other end of the return spring abuts against the sliding member.

7. The wheel assembly according to claim 6, wherein the sliding member is further provided with a first protrusion and a second protrusion, and the return spring is sleeved over the first protrusion.

8. The wheel assembly according to claim 7, wherein the other end of the transverse guide groove is provided with an opening; the detachment mechanism further comprises a button, and the button is mounted on the second protrusion and extends out of the opening.

9. The wheel assembly according to claim 8, wherein the button is disposed on one side of the first engagement portion, and the return spring is disposed on the other side of the first engagement portion.

10. The wheel assembly according to claim 1, wherein the mounting base further comprises a cover body, and the cover body covers over the transverse guide groove.

11. The wheel assembly according to claim 10, wherein the cover body is provided with a screw; the mounting base is provided with a mounting hole corresponding to the screw, and the cover body is fixed to the mounting base by the screw.

12. The wheel assembly according to claim 1, wherein the insertion shaft further comprises a second end portion; the second end portion is provided with a second engagement portion pivotally connected to the wheel bracket.

13. The wheel assembly according to claim 12, wherein the caster assembly further comprises a pin; the wheel bracket is provided with a shaft hole; the second engagement portion is rotatably disposed in the shaft hole, and the pin is disposed in a wall of the shaft hole and engaged with the second engagement portion.

14. The wheel assembly according to claim 1, wherein an end face of the first end portion is provided with a first chamfer configured to guide the insertion shaft into the insertion hole.

15. The wheel assembly according to claim 1, wherein a lower surface of the positioning structure is provided with a second chamfer cooperating with the first engagement portion; the second chamfer is configured to facilitate smooth sliding of the positioning structure into the first engagement portion.

16. The wheel assembly according to claim 1, wherein an outer periphery of each said rotating wheel is made of rubber.

17. The wheel assembly according to claim 1, wherein both the first housing and the second housing are made of polyethylene.

* * * * *